(12) United States Patent
Heathwood et al.

(10) Patent No.: US 10,034,458 B2
(45) Date of Patent: Jul. 31, 2018

(54) MULTI-PURPOSE PET MAT

(71) Applicant: Worldwise, Inc., Novato, CA (US)

(72) Inventors: Karen Heathwood, San Rafael, CA (US); Aimee Diskin, Napa, CA (US); Hannah Rosenberg, San Francisco, CA (US)

(73) Assignee: Worldwise, Inc., Novato, CA (US)

( * ) Notice: Subject to any disclaimer, the term of this patent is extended or adjusted under 35 U.S.C. 154(b) by 223 days.

(21) Appl. No.: 15/229,584

(22) Filed: Aug. 5, 2016

(65) Prior Publication Data

US 2018/0035643 A1    Feb. 8, 2018

(51) Int. Cl.
*A01K 1/035*    (2006.01)
*A01K 15/00*    (2006.01)
*A01K 15/02*    (2006.01)

(52) U.S. Cl.
CPC .................. *A01K 15/024* (2013.01)

(58) Field of Classification Search
CPC ..... A01K 1/035; A01K 1/0353; A01K 15/024
See application file for complete search history.

(56) References Cited

U.S. PATENT DOCUMENTS

| | | | | |
|---|---|---|---|---|
| 1,887,108 A * | 11/1932 | Steese | ................. | A01K 1/0353 119/482 |
| 2,032,248 A * | 2/1936 | Bins | ................. | A01K 1/0353 119/28.5 |
| 2,775,222 A * | 12/1956 | Kruck | ................. | A01K 1/0353 119/482 |
| 4,008,687 A * | 2/1977 | Keys | ................. | A01K 1/0353 119/482 |
| 5,010,843 A * | 4/1991 | Henry | ................. | A01K 1/0353 119/28.5 |
| 5,357,901 A * | 10/1994 | Batts | ................. | A01K 1/0353 119/28.5 |
| 6,378,456 B1 * | 4/2002 | Jerome | ................. | A01K 1/0353 119/28.5 |
| 2006/0070577 A1 * | 4/2006 | Foley | ................. | A01K 1/0353 119/28.5 |
| 2007/0215062 A1 * | 9/2007 | Cummings | ................. | A01K 1/0353 119/706 |
| 2013/0284099 A1 * | 10/2013 | Oakes, Jr. | ................. | A01K 29/00 119/28.5 |
| 2014/0230735 A1 * | 8/2014 | Coulter | ................. | A01K 1/0353 119/28.5 |

FOREIGN PATENT DOCUMENTS

WO    WO-2012112731 A2 *    8/2012    ........... A01K 1/0353

* cited by examiner

*Primary Examiner* — Monica L Williams
(74) *Attorney, Agent, or Firm* — Bay Area Technology Law Group PC

(57) ABSTRACT

A pet mat having a bottom for contacting a support surface, the bottom having a bottom peripheral edge and a top having a top peripheral edge. The bottom peripheral edge and top peripheral edge are joined to define the shape of the pet mat and to enclose a fill material therein, the top facing away from the bottom for receiving a pet utilizing the pet mat. The top includes a backing layer joined to the top peripheral edge and a plurality of fabric layers, each being at least partially joined to the top peripheral edge, a first of the fabric layers having an edge unattached to the top peripheral edge creating a flap sized to enable a domestic cat to be received between the first fabric layer and backing layer and at least one of the fabric layers being a scratcher surface.

4 Claims, 1 Drawing Sheet

MULTI-PURPOSE PET MAT

TECHNICAL FIELD

The present invention involves a novel pet mat having certain features which satisfy a plurality of needs recognized as being important to maintain the health and well-being of a domestic cat. Specifically, the present inventive pet mat can satisfy a cat's need to rest, its need for seclusion and to hunt and scratch without resort to any other typically employed toys, scratchers or furniture items.

BACKGROUND OF THE INVENTION

Domestic pets, particularly cats, have certain needs which, if left unfulfilled, can result in irritability, depression and can even result in more severe physical and emotional problems. For example, cats require a soft and cushioned surface upon which to lounge and relax. To that end, the pet product arena is populated with numerous versions of pet mats, many of which have plush pads and soft cushioning materials to promote sleep and relaxation.

In addition, it is well recognized that domestic cats crave scratching as part of their natural instinctive character. If a dedicated scratching surface is not provided, domestic cats will generally satisfy their need to scratch by turning to furniture, curtains and other articles which may be substantially damaged as a consequence. Often times, pet cats will not only climb over furniture, specifically upholster chairs and sofas, but will use such furniture and carpeting to condition their claws through deliberate and repeated clawing, pulling and tearing actions. As noted, this clawing activity appears to be an irresistible natural impulse for cats and can be the source of great aggravation to the pet owner. As such, it is generally believed that a dedicated scratcher is a necessity for any cat owner.

Cats also require seclusion. Although a domestic cat can be a great source of companionship, there are times when a cat's overall health is promoted by providing an area where the cat can rest and relax, that is, in an area that makes it feel safe. A safe environment encourages the cat to relax without fear of predators. To satisfy this need, pet owners often times purchase furniture having an opening sized to enable a cat to pass through and a hollow interior facilitating rest and relaxation in a nurturing environment.

Finally, cats have the instinctive need to hunt and pounce and, to satisfy this need, pet owners will provide toys and the like to encourage the cat to swat, pounce and grab a toy's attractant. Such an attractant need be nothing more than a piece of string or rope with, for example, a feathered bundle which is introduced to the vicinity of the cat or dangled in front of it to promote interest.

As the above discussion clearly suggests, to satisfy all of the cat's inherent needs, the pet owner is required to purchase a plurality of products which can oftentimes prove to be challenging. Many pet owners are forced to dedicate only a limited space for their pets which is not conducive to the inclusion of mats, furniture, scratchers and toys. Furthermore, as each of these items is sold separately, the cumulative cost can represent a financial burden.

It is thus an object of the present invention to provide a pet mat which has the capability, in a single product, of satisfying the cats need to lounge, scratch, pounce and hunt as well as providing an area for seclusion.

These and further objects will be more readily apparent when considering the following disclosure and appended claims.

SUMMARY OF THE INVENTION

A pet mat comprising a bottom for contacting a support surface, said bottom having a bottom peripheral edge and a top having a top peripheral edge, said bottom peripheral edge and said top peripheral edge being joined to define the shape of the pet mat and to enclose a fill material therein, said top facing away from said bottom and for receiving a pet utilizing said pet mat, said top comprising a backing layer joined to said top peripheral edge and a plurality of fabric layers, each at least partially joined to said top peripheral edge, a first of said fabric layers having an edge unattached to said top peripheral edge creating a flap sized to enable a domestic cat to be received between said first fabric layer and said backing layer and at least one of said fabric layers comprising a scratcher surface.

DETAILED DESCRIPTION OF THE INVENTION

Figure 1:
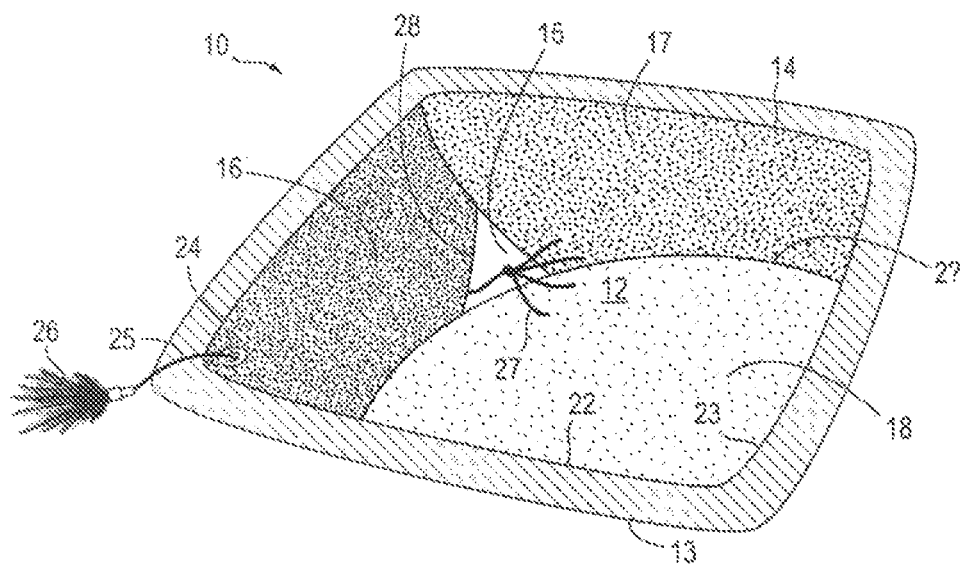
FIG. 1 is a perspective view of the pet mat of the present invention.
Figure 2:
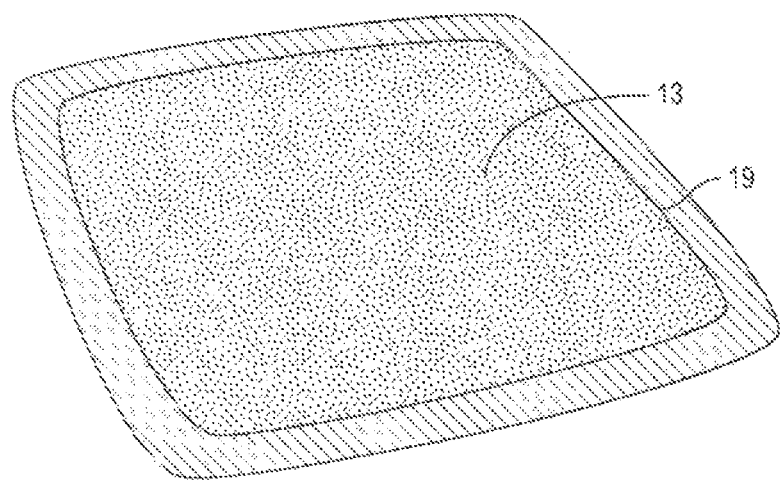
FIG. 2 is a bottom plan view of the pet mat of FIG. 1.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In reference to FIG. 1, pet mat 10 is shown having top surface 12 and bottom surface 13, the latter for contacting a support surface such as the floor of the pet owner's home (not shown). Surface 12 is characterized as having peripheral edge 14 while bottom surface 13 is characterized by peripheral edge 19, the top and bottom peripheral edges being joined to define the shape of pet mat 10 and to enclose fill material such as foam or fibers (not shown) for cushioning. As depicted, top surface 12 faces away from bottom surface 13 and is intended to be the surface for receiving a pet utilizing the mat.

Top surface 12 is characterized as having a backing layer 15 which can be a plush fiber or nothing more than a liner for the fill material generally, backing layer 15 consisting of a sheet of suitable material maintained by joining the peripheral edges of top surface 12 and bottom surface 13.

Pet mat 10 and particularly top surface 12 is characterized as having a plurality of fabric layers, in the illustrated example, three such fabric layers 16, 17 and 18 are depicted. As noted, fabric layers 16, 17 and 18 are at least partially joined to top peripheral edge 14 while each has at least an edge unattached to top peripheral edge 14. As shown, a first of the fabric layers 18 has curved edge 21 unattached to top peripheral edge 14 creating a flap sized to enable domestic cat to enter and be received between first fabric layer 18 and backing layer 15. Thus, a cat can lounge upon pet mat 10 on top surface 12 and when desired, can nuzzle beneath first fabric layer 18 and be secluded between first fabric layer 18 and backing layer 15.

As a preferred embodiment, each of the fabric layers 16, 17 and 18 can be composed of different materials. For example, they can be selected from the group consisting of plush polyester, nylon and burlap, the latter acting as a scratcher surface. Thus, a cat can lounge upon top surface 12 of pet mat 10 and when the need presents itself, can use pet mat 10 as a scratcher thus obviating the need for standalone scratching post or other scratching implement. It is been found that this encourages scratching as the lounging cat need not leave pet mat 10 to seek out a dedicated scratcher where it could be sidetracked into using upholstered furniture and the like to satisfy its need to scratch but, instead, can simply satisfy this need on the very lounging surface provided by pet mat 10.

As a further preferred embodiment, pet mat 10 is provided with an attractant. In the illustrated example, the attractant comprises rope or string 25, such as a jute, being of a length which passes beneath fabric layer 16 from islet 24 to edge 28. An end attractant 26, such as a feathered bundle, is joined to one end of rope or string 25 while the rope or string is intentionally frayed creating attractant 27 at the second end thereof. As rope string 25 is slidable beneath fabric layer 16, as the cat swats and pulls upon one of the attractants 26/27, the other attractant at the opposite end of rope or string 25 moves creating additional interest in encouraging the cat's pouncing instinct to take over.

As is clearly apparent, the present invention satisfies numerous instincts that a cat inherently possesses and which must be addressed by any responsible pet owner in a relatively small, convenient and inexpensive form factor. As a pet mat or bed must always be provided to one's cat, the present singular mat can perform the functions of a scratcher, attractant toy and seclusion-promoting structure. Such a product is not only less expensive to ship, warehouse and display than the bundle of products necessary to meet these same needs but is much more environmentally friendly when the pet owner desires to dispose of it.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A pet mat comprising a bottom for contacting a support surface, said bottom having a bottom peripheral edge and a top having a top peripheral edge, said bottom peripheral edge and said top peripheral edge being joined to define the shape of the pet mat and to enclose a fill material therein, said top facing away from said bottom and for receiving a pet utilizing said pet mat, said top comprising a backing layer joined to said top peripheral edge and a plurality of fabric layers, each at least partially joined to said top peripheral edge, a first of said fabric layers having an edge unattached to said top peripheral edge creating a flap sized to enable a domestic cat to be received between said first fabric layer and said backing layer and at least one of said fabric layers comprising a scratcher surface; and an attractant comprising a rope or string, the length of which passes beneath one of said plurality of fabric layers and is provided with an end attractant feature at each end thereof, said rope or string is slidable beneath said one of said plurality of fabric layers such that when a pet pulls on one end of said rope or string, the second end of the rope or string moves as a consequence.

2. The pet mat of claim 1 wherein said plurality of fabric layers comprise at least three of said fabric layers.

3. The pet mat of claim 1 wherein said plurality of fabric layers comprise members selected from the group consisting of plush polyester, nylon and burlap.

4. The pet mat of claim 1 wherein at least one of said end attractant features comprises a feathered bundle.

* * * * *